United States Patent [19]

Stock

[11] 3,812,698

[45] May 28, 1974

[54] SPIN-FLANGING TOOL
[75] Inventor: Edwin Henry Stock, St. Louis, Mo.
[73] Assignee: Intertherm, Inc., St. Louis, Mo.
[22] Filed: Mar. 5, 1973
[21] Appl. No.: 338,166

[52] U.S. Cl. .................. 72/71, 29/157 T, 72/114
[51] Int. Cl. .................................. B21d 22/14
[58] Field of Search ......... 29/157 T, 523; 72/70, 71, 72/114, 325, 370, 379

[56] References Cited
UNITED STATES PATENTS
2,703,419  3/1955  Barth ............................ 29/523
3,187,538  6/1965  Painter .......................... 72/114
3,269,006  8/1966  Welles, Jr. ..................... 10/152
3,364,963  1/1968  Turnbull ........................ 72/71
3,396,562  8/1968  Thigpen ......................... 72/71

Primary Examiner—Lowell A. Larson

[57] ABSTRACT

A tool forms an externally flanged hole, either in ductile flat sheet metal or tubes, by a single downward rotating stroke. Circular slugs are removed and the resultant circular edges spun upward and outward in flanges of precise inner and outer diameter. The tool is especially useful where T-connections are to be brazed to the wall of a ductile metal tube.

8 Claims, 6 Drawing Figures

SPIN-FLANGING TOOL

BACKGROUND OF THE INVENTION

The present invention relates to flanging of holes in ductile sheet metal workpieces, and particularly cutting and flanging a hole by a single downward stroke of a rotating tool.

To permit brazing of metal tubes into other parts, for example, tubes of larger diameter, it is important that flanges be formed whose inner diameters are so accurate as to assure perfect brazed joints, and whose upper edges are free from cracks. It is desirable that such flanged holes be cut and formed with reliability by production machine tools similar to drill presses, whose rate of feed may be automatically controlled.

Tools conventionally used lack the advantage of easy, trouble-free use. Typical is the tool shown in U.S. Pat. No. 3,592,038; this has two elements which project to spin a flange during the withdrawal of the tool. Such tools require careful control over the speed of withdrawal as well as the in-feed, and are mechanically more complex and delicate than is desirable for use in mass production. Further, such tools so stretch the metal as to make flanges which are not uniformly thick and whose edges may crack. To braze a tube onto the outer side of such a flange may result in an unsound joint.

A different type of tool is shown in U.S. Pat. No. 2,991,551, which operates by swaging. Intended for use with relatively thick walled metal pipes, it relies on high speed rotation to create such heat and pressure as to melt the metal and swage it both inwardly and outwardly. Such a heat-swaging process is readily distinguished from the gentle spinning process of the tool of U.S. Pat. No. 3,592,038 and of that of the present invention.

SUMMARY OF THE INVENTION

The objects of the present invention include forming upwardly flanged holes in ductile sheet metal workpieces by a single controlled down stroke of a rotating tool, the flanges to have precisely sized inner and outer diameters. Further purposes include combining with such tool means to cut and remove a circular slug. Still another purpose is to provide a clamping fixture which cooperates with the tool to control the diameter of the edge of the flange. The accomplishment of these and other purposes is described hereafter.

Summarizing briefly and without limiting the scope of the invention, a tool is provided which is preferably used in that type of drill press whose rate of feed is automatically controlled. Below the tool shank portion, it has a threaded portion which tapers from a maximum diameter, downward and inward to a minimum diameter base end, preferably equipped with a slug cutting tip. Commencing at the base end, multiple lead threads lead upward to the maximum diameter. The upward and outward presented surfaces of such threads are smoothly rounded.

Preferably the slug cutting tip has a downward pointed center which bears against and holds the slug until it is cut evenly. As soon as the minimum diameter threaded portion enters the hole so cut, if the feed of the tool were not restrained it would have a tendency to screw itself downward into the hole. However, the rate of downward movement of the tool per revolution is restrained; it is limited to an amount substantially less than the pitch of the threads. Accordingly, rotation of the tool causes its upward and outward presented surface portions to bear upwardly against the edge of the hole so cut. Thus, the rotating tool, descending more gradually than the pitch of the threads, causes their upward and outward presented portions to spin the hole edge upwardly into a flange, as hereinafter more fully described.

DESCRIPTION OF THE PREFERRED EMBODIMENT

Figure 1:
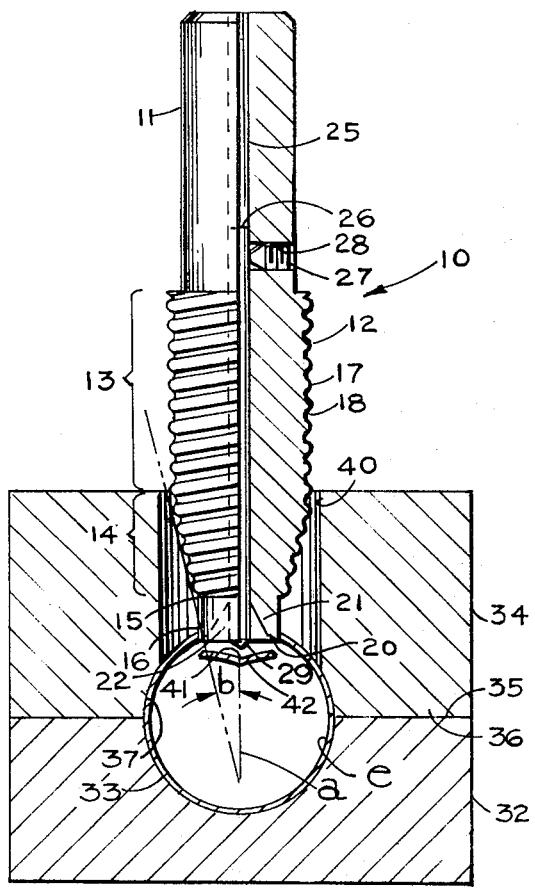
FIG. 1 is a view, partly in elevation and partly in section, of the present spin-flanging tool shown cutting a circular slug from a tubular workpiece held in a fixture.
Figure 2:
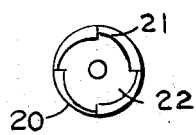
FIG. 2 is a bottom end view of the tool of FIG. 1.

The spin-flanging tool of the present invention, generally designated 10, is best shown in FIGS. 1 and 2. It is made of a material, such as dense, high pressure sintered carbide, which is suitable both for hole cutting and surface contact by spinning. Being formed about a central vertical axis $a$, the tool 10 includes a conventional shank portion 11 by which it may be held in a drill press, preferably of the type controlled as to feed, as hereinafter described. Below the shank portion 11 is a threaded portion 12 which includes the smooth-surfaced special rounded threads hereinafter described. As shown in the drawings, the threaded portion 12 has double-lead threads; in specialized applications, triple-lead threads may be desired. The threaded portion 12 includes, immediately beneath the shank portion 11, a constant diameter portion 13. This is an upward continuation of a tapered threaded portion 14 which tapers at an angle $b$ downwardly and inwardly toward the axis $a$, to the smallest valley 15, immediately above the base end 16 of the tool 10, whose diameter is slightly greater than that of the valley 15.

Both the tapering threaded portion 14 and the straight portion 13 consist of smooth, preferably highly polished rounded threads whose crests 17 may be of greater radius than the valleys 18 therebetween. At the minimum, the upward and outward presented surface portions must be smoothly rounded and have a surface texture capable of spinning metal of the workpieces to be formed. In a tool whose constant diameter portion is of ⅝ inch, the crests 17 may have a radius of approximately 0.03 inch and the valleys 18 a radius of approximately 0.022 inch.

Threads at 10 per inch on a double-lead have been found to be suitable. Such double-lead threads are developed out of the smallest valley 15 at 180° spacings. These dimensions are well suited for forming copper tubing of a usual thickness range, a typical example being 1/32 inch.

Below the lowest valley 15, the base end 16 extends downward to a circular slug cutting tip edge 20. This edge has a plurality of inward cutting teeth 21 formed at desired rake angles within the edge 20, and bounded inwardly by a hollow inside tip portion 22. Any other cutting tip conformation may be used which will cut out cleanly the slugs from the walls of metal workpieces to be flanged. For a hole in a copper tube of ⅞ inch outer diameter, in which a ⅛ inch flanged surface is to surround a ⅝ inch hole, the slug diameter should be approximately ⅜ inch. Variations will follow from varying thicknesses of metal, its ductility, and other factors as are known in the art.

The tool 10 has a central bore 25 along its axis $a$. In the bore 25 is an elongated central pin 26, held by a set screw 27 in a tapped lateral bore 28 in the side wall of the shank portion 11. The lower end of the central pin 26 has a center point 29 which projects below the cutter edge 20. The precise amount of its projection may be adjusted, dependent upon variables such as the ductility of the workpiece which it will indent.

To hold tubular workpieces, such as the workpiece $c$, fixture means are provided. FIG. 1 illustrates such fixture means somewhat schematically. A lower fixture half 32 has a semi-circular groove 33 whose diameter corresponds to the outer diameter of the workpiece $c$. An upper fixture 34 has a square cut bottom surface 35 to mate with the correspondingly square upper surface 36 of the lower fixture 32. In the surface 35 a downward semi-circular groove 37 is provided in whose contour fits closely adjacent to the upper surface of the tubular workpiece $c$. Through the upper fixture 34 extends a cylindrical tool passage 40 which intersects the groove 37. The diameter of the tool passage 40, upwardly adjacent to the groove 37, is substantially equal to the constant diameter portion 13 of the tool 10 plus twice the thickness of the flange to be formed. Such flange thickness will normally be approximately equal to the wall thickness of the workpiece $c$.

The tool 10 is preferably used in an automatic drill press which can be controlled not only as to speed of rotation but also as to feed, and which resists downward forces on the tool, as hereinafter described. Alternately, a skilled operator of a simple drill press can be readily taught to control the feed of the tool to resist such downward forces. In production operations, automatically controlled drill presses may also use indexing means to move either the fixture or the spindle, for flanging a plurality of holes in a single workpiece; it is understood that for this purpose a tool passage bore 40 will be provided for each hole to be cut and flanged.

Figure 3:
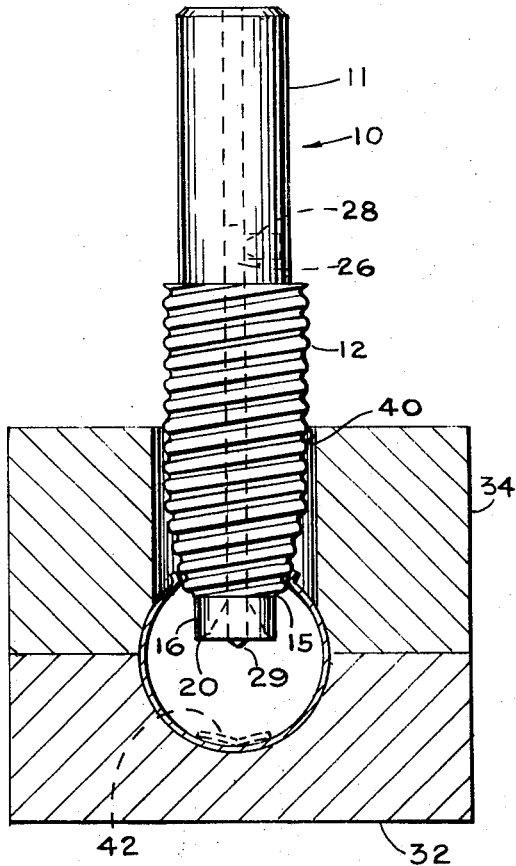
FIG. 3 is an elevational view generally similar to FIG. 1, showing the tool commencing to spin a flange on the edge from which the circular slug was removed. The slug is shown in dashed lines.

FIG. 1 illustrates how the tool 10 enters the passage 40 and cuts the hole. As the tool 10 descends, its point 29 presses against the upper wall of the tube, forming a central indentation 41 in the circle of material cut out as a slug 42. By holding the indentation 41 centered, the point 29 retains the slug 42 until the cutting edge 20 has completed a cleanly cut circular edge 43 in the workpiece. When the slug 42 is cut completely, it falls down out of the way, into the position shown in dashed lines in FIG. 3. The tool 10 then continues to descend until the smallest valley 15, immediately above the base end 16, enters circular edge 43.

Inasmuch as the double-lead threads of the tapered portion 14 are developed commencing from the valley 15, whose diameter is less than that of the edge 43, the lower ends of the threads will pass through the lowermost portions of the edge 43; their upward and outward presented surface portions will then bear upwardly and outwardly against it. This upward and outward bearing, as the rotating tool is moved downward at a rate per revolution which is much less than the pitch of the threads, will cause them to turn the edge 43 upward and compress it slightly. Continued slow downward movement of the rotating tool brings larger-diameter upper and outer surfaces of the tapered portion 14 into contact. These progressively form the edge into a flange of increased height and width, as seen by comparison of FIGS. 3 and 4.

Figure 4:
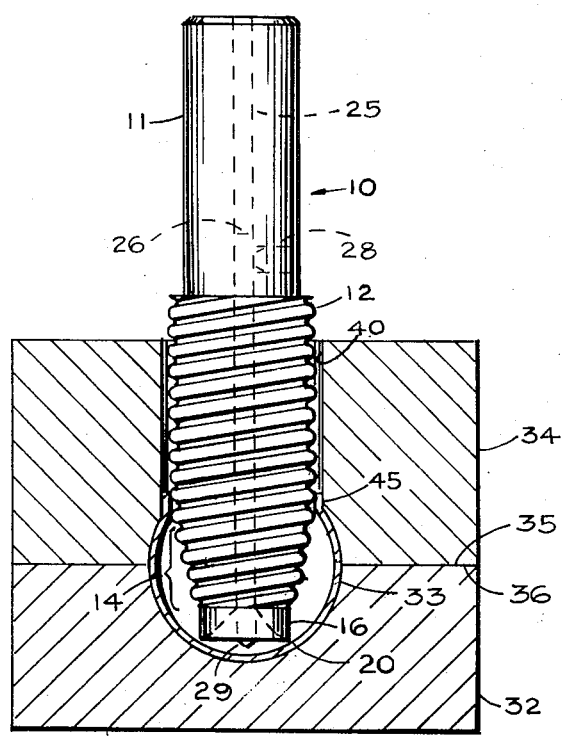
FIG. 4 is a view similar to FIG. 3 showing the tool in position for completing the flanging operation.

As the spinning progresses, there is a tendency for the edge being spun to curl outward. However, as the downward movement of the tool 10 brings its constant diameter portion 13 to the level of the flange being formed, the tool passage 40 will "back up" the flange being formed, so that it is circumferentially compressed and finished off as a cylindrical flange 45, as seen in FIG. 4. It will be noted that at this stage the center point 29 of the central pin 26 may be fairly close to the bottom wall of the tube $c$. For this reason the base end 16 must be kept fairly short and the taper angle $b$ be kept fairly large, unless the tube diameter is large in comparison to that of the flanged hole.

For forming flanges 45 whose inner diameter is ⅝ inch, on holes in a copper tube of ⅞ inch outer diameter, the optimum angle $b$ of the tool's tapered portion 14 appears to be approximately 15°. Using the same tool 10 to form a ⅝ inch inner diameter flange on a ¾ inch tube would be likely to result in the center point 29 and tip edge 20 cutting the lower wall of the tube. Accordingly for such large ratios of flange diameter to tube diameter a greater taper angle would be necessary, which might be as great as 25°. Alternately the hole could be cut first by one tool, and a second tool with a 15° taper angle but no base end 16 or cutting edge 20 might be used for the flanging operation.

On the other hand, if flanges are to be formed on flat sheet metal (using a suitable holding fixture with a similar tool passage 40) the taper angle $b$ might be reduced to as little as 5°. As is known, differences in metal ductility, height of the flange to be formed, and other considerations will affect the tool design including the thread size and pitch. Such factors may readily be determined by routine experimentation.

Due to the compressive effect of the outward bearing of the thread surfaces, spinning of the edge 43 is not accompanied by severe thinning, nor is cracking experienced to the extent expected of spinning operations which elongate a metal edge. Further, finishing the flange 45 includes compressive working against the lower end portion of the cylindrical tool passage 40, giving the flange precise inside and outside dimensions.

Figure 5:
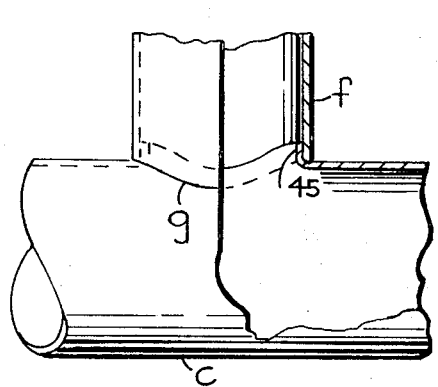
FIG. 5 is a view principally in section showing a second tube positioned inside the flange of FIG. 4, in position for assembly by brazing.

FIG. 5 shows a simple method of joining an intersecting tube $d$ to the tubular workpiece $c$. The intersecting tube $d$ is of diameter slightly smaller than the finished internal diameter of the flange 45, and is inserted inside the flange.

Figure 6:
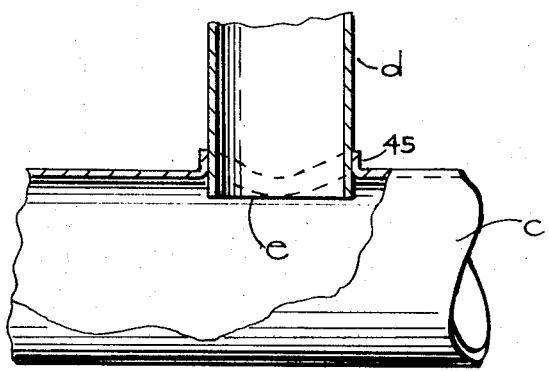
FIG. 6 shows an alternate assembly, with another tube positioned outside of the flange of the workpiece of FIG. 4.

Referring to FIG. 6, an intersecting tube $f$ of larger diameter is shown in position for brazing to the outer surface of the flange 45. To prepare such tube $f$ for brazing its lower end $g$ is formed to fit the intersection of the flange 45 with the workpiece $c$, in a fishmouth edge g. The precise cylindrical conformation of the outer surface of the flange 45, as fixed by working it against the inner surface of the tool passage 40, makes brazing to them relatively advantageous; thus by joining to the outer flange surface, the intersecting tube f of FIG. 6 may be of substantially or nearly the same outer diameter as that of the workpiece c.

The present tool is therefore simple in use, in both cutting a hole and flanging it on a single downstroke. Further it is of such ruggedness as to minimize tool maintenance. These advantages are apparent by comparison to the type of tool shown in U.S. Pat. No. 3,592,038 in which flange forming extensions must be projected diagonally through slanting bores in a special drill, for flanging on the withdrawal stroke of the drill press.

To cut edges 43 consistently smooth enough for spin flanging on the slow down stroke of the present tool, the provisions at the base end 16 are of particular importance. Thus, the slugs 42 are cut out cleanly by the cutting edge 20 partly because the center point 29 effectively retains the slugs 42 until the cutting process has been completed. Also, in contrast to the drilling operation of U.S. Pat. No. 3,592,038, the present cutting operation leaves no drill-cut chips which might interfere with a cleanly spun flange.

I claim:

1. For use in a drill press or the like to form flanges about holes in ductile sheet metal workpieces,
    a spin-flanging tool having a central axis and comprising
    a shank portion whereby to engage to such a drill press, and
    a threaded portion commencing below the shank portion at a maximum diameter and extending downwardly therefrom and tapering inward toward such axis to a minimum diameter base end,
    said tapered thread portion having
    multiple lead threads commencing at equal spacings about such base end and leading upward from its minimum diameter to such maximum diameter,
    the upward and outward presented surface portions of such threads being smoothly rounded,
    whereby, when the rate of downward movement of the tool per revolution is restrainedly limited to an amount less than the pitch of the threads, said thread surface portions will progressively bear upward and outward against the edge of a hole in such workpiece, thereby to spin such edge into an upward flange.

2. A spin-flanging tool as defined in claim 1 and useful where the workpieces are tubes, wherein
    the angle of taper of the threaded portion is substantially 15°.

3. A spin-flanging tool as defined in claim 1, wherein
    the angle of taper of the threaded portion is in the range between 5° and 25°.

4. A spin-flanging tool as defined in claim 1, wherein
    the number of said multiple lead threads is two and
    all surface portions of said threads are rounded, to form crests and valleys, and
    the crests have a radius larger than that of the valleys.

5. For use in a drill press or the like to form flanged holes in ductile sheet metal workpieces,
    a hole cutting and flanging tool comprising
    the spin-flanging tool defined in claim 1, further having
    a circular cutting tip projecting downward at its base end.

6. A hole cutting and flanging tool as defined in claim 5, wherein
    the radius of the cutting tip exceeds the radius to the thread valley immediately thereabove,
    whereby said multiple threads may enter a hole so cut and bear upwardly against its edge.

7. A hole cutting and flanging tool as defined in claim 6, in which
    the cutting tip has along the tool axis, a downwardly projecting pointed center,
    whereby to indent and hold centered the circular slug portion of such workpiece as cut by the tip.

8. In combination, a spin-flanging tool as defined in claim 1, and
    upper fixture means having a lower surface portion of predetermined contour, whereby to fit closedly adjacent to the upper surface of such workpiece to be flanged, and having therethrough
    a tool passage including a cylindrical flange-confining portion commencing at the said fixture lower surface portion and extending upwardly therefrom,
    the diameter of said flange-confining portion upwardly adjacent to said lower surface portion being substantially equal to the sum of said maximum diameter of the tool threaded portion plus twice the thickness of the flange to be formed.

* * * * *